H. E. SCHULTZ, Jr.
GRASS CATCHER FOR LAWN MOWERS.
APPLICATION FILED OCT. 27, 1916.
1,219,169.
Patented Mar. 13, 1917.
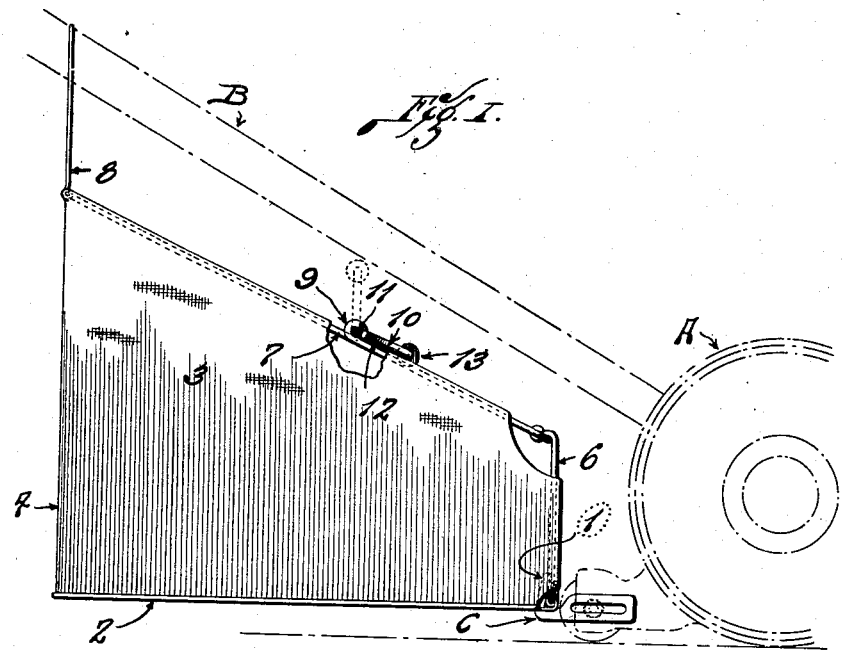
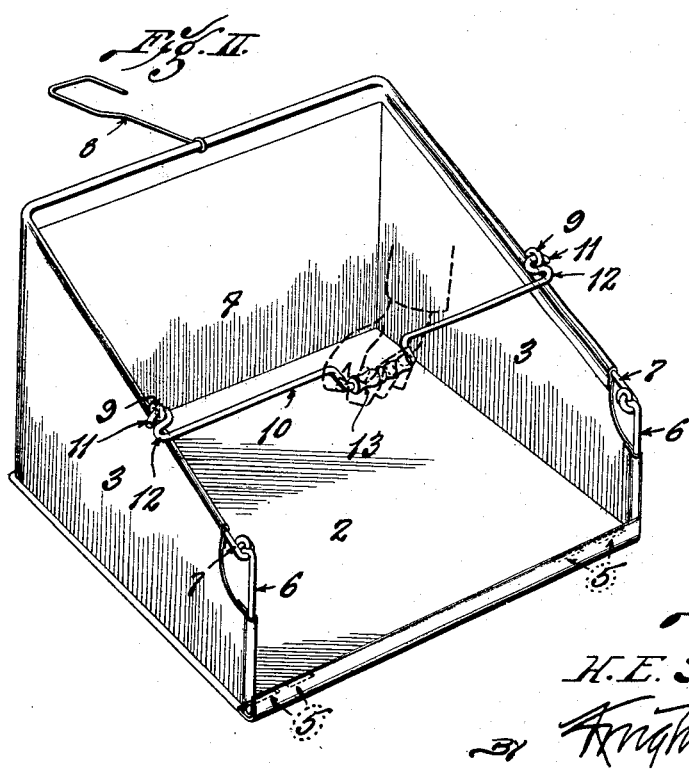
INVENTOR:—
H. E. SCHULTZ Jr.

UNITED STATES PATENT OFFICE.

HERMAN E. SCHULTZ, JR., OF ST. LOUIS, MISSOURI, ASSIGNOR TO ZITTLOSEN MANUFACTURING COMPANY, A CORPORATION OF MISSOURI.

GRASS-CATCHER FOR LAWN-MOWERS.

1,219,169.  Specification of Letters Patent.  Patented Mar. 13, 1917.

Application filed October 27, 1916. Serial No. 128,022.

*To all whom it may concern:*

Be it known that I, HERMAN E. SCHULTZ, Jr., a citizen of the United States of America, a resident of the city of St. Louis, State of Missouri, have invented certain new and useful Improvements in Grass-Catchers for Lawn-Mowers, of which the following is a full, clear, and exact description, reference being had to the accompanying drawing, forming a part of this specification.

My invention relates to a grass catcher adapted to be detachably secured to the frame and handle of a lawn mower, and also adapted to be carried away from the lawn mower and tilted to discharge the grass at a point remote from the lawn mower.

The main object of the invention is to produce a grass receptacle of this kind swinging freely upon a bail which is adapted to be used in lifting and carrying the receptacle, and also adapted to serve as means for positively tilting the receptacle to discharge the grass therefrom. With this object in view, the bail is pivotally connected to the grass receptacle so that the receptacle and its contents may be pivotally suspended from the bail and very easily carried away from the lawn mower. However, the end portions of the bail are offset from the pivotal points so as to engage the grass receptacle, thus limiting the pivotal movement of the bail so that the grass receptacle may be positively tilted by firmly grasping and turning the pivoted bail.

Figure I is a side elevation of a grass catcher constructed in accordance with my invention, a lawn mower being shown by dotted lines.

Fig. II is a perspective view of the grass receptacle.

A designates a lawn mower provided with a handle B. Hooks C, secured to the lawn mower frame, are provided with upturned arms or posts 1 adapted to receive a grass receptacle.

The grass receptacle preferably comprises a sheet metal bottom 2, fabric side walls 3 and a fabric rear wall 4. The sheet metal bottom is provided with slots 5 for the reception of the arms 1 on the lawn mower frame. The wire frame comprises a pair of arms 6 extending upwardly from the bottom 2, and a top wire member 7 extending along the upper edges of the side and rear walls 3 and 4.

The front of the grass receptacle is detachably secured to the lawn mower by means of the arms 1 which extend through the slots 5 in the bottom of the receptacle, and the rear portion of the receptacle is detachably secured to the lawn mower handle by means of the usual hook 8.

The wire frame member 7 is bent to form a pair of upwardly extending eyes 9 at the opposite sides of the grass receptacle. 10 is a bail which preferably consists of a single piece of S-shaped wire bent to form a pair of hooks providing pivots 11 which enter the upwardly extending eyes 9 to pivotally connect the bail to the receptacle and a pair of U-shaped loops 12, the latter being offset from the pivotal connections, so as to engage the upper edge of the receptacle at points in front of the eyes 9, thus limiting the pivotal movement of the bail and allowing the grass receptacle to be positively tilted by firmly grasping and turning the pivotal bail. The middle portion of the bail is of double crank form providing an offset or hand-hold at the middle of the grass receptacle, and provided with a hand receiving member or sleeve 13 adapted to be grasped with the offset or hand-hold in carrying and tilting the receptacle.

In Fig. I, dotted lines show the position of the bail when the receptacle is being lifted or carried from the lawn mower. The receptacle and its contents are then freely suspended from the pivoted bail. However, when the receptacle is to be tilted to discharge its contents, the bail with its offset or hand-hold are firmly grasped and turned to the position shown in Fig. II wherein the offset loops 12 engage the upper edge of the receptacle. The tilting is thus effected by simultaneously exerting a downward pressure on the offset or hand-hold and an upward pressure on the bail. The pivotal movement of the bail is thus limited by the offset loops 12, and the receptacle may be readily tilted by turning the bail, the offset or hand-hold at the middle portion of the bail being grasped, as indicated by the dotted hand in Fig. II.

I claim:—

A grass catcher comprising a grass receptacle having means for detachably securing it to a lawn mower; said receptacle having a top frame formed with a pair of pivot-eyes at the sides thereof and a bail having an offset hand-hold provided with means for pivoting it to said pivot-eyes and means offset from said pivoting means adapted to engage the top of the frame at the sides of the frame so as to limit the movement of the bail in a forward direction for tilting the grass catcher and delivering the load.

HERMAN E. SCHULTZ, Jr.